March 9, 1948. F. M. STEPHENS 2,437,446
GAS PULSATION DAMPENING APPARATUS
Filed July 26, 1944
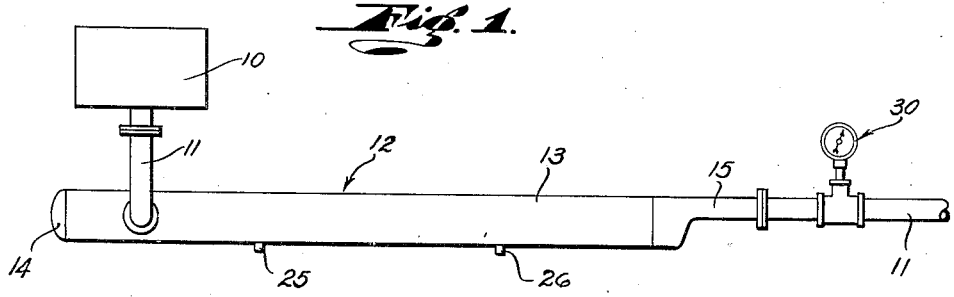
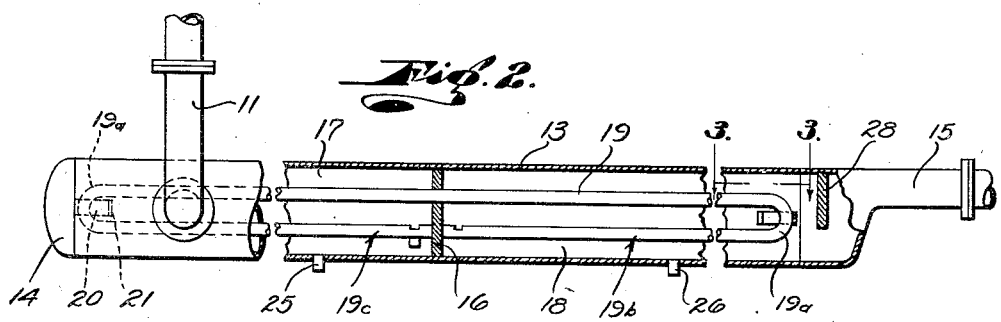
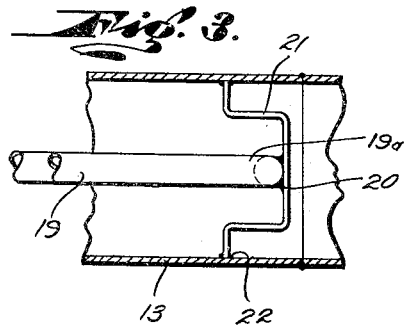
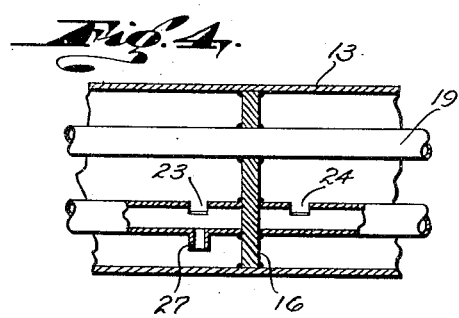
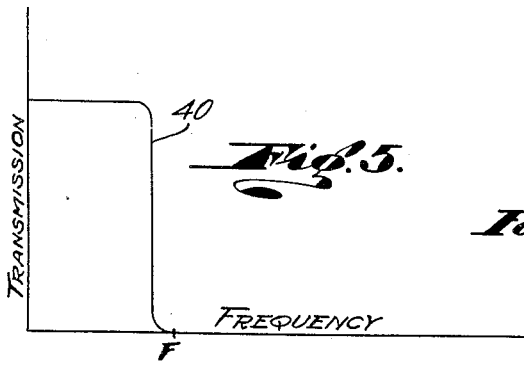
FOSTER M. STEPHENS
INVENTOR.
BY H. Malcolm White
ATTORNEY Patented Mar. 9, 1948

2,437,446

UNITED STATES PATENT OFFICE 2,437,446

GAS PULSATION DAMPENING APPARATUS

Foster M. Stephens, Los Angeles, Calif., assignor to The Fluor Corporation, Ltd., Los Angeles, Calif., a corporation of California Application July 26, 1944, Serial No. 546,657

10 Claims. (Cl. 181—48)

This invention has to do with apparatus for eliminating pulsations in gas streams, created for example by positive displacement pumps, and has for its general object to provide improvements in the type of equipment constituting the subject matter of my copending application Ser. No. 517,857, filed January 11, 1944, on Pulsation elimination in gas lines.

From the standpoint of its performance, the present type of apparatus is intended to substantially eliminate in a gas stream transmitting pulsations at a determinable or fundamental frequency, all pulsations at and above that frequency, and thereby distinguish the invention in principle and performance from all other mufflers or gas pulsation eliminators of which I am aware. As explained in somewhat greater detail in my earlier filed application referred to above, such frequency elimination may be accomplished in a highly efficient manner and at low pressure drop, by passing the gas through a simple combination of chambers, serving as acoustical capacitances, interconnected by a relatively restricted passage constituting an acoustical inductance, the volumes of the chambers and the dimensions of the interconnecting passage being determined with relation to the fundamental frequency of the pulsations as hereinafter explained.

The present invention has for its more particular object to provide a unitary apparatus containing the chambers and interconnecting passage and characterized by its practical adaptability for construction and installation as a unit in the gas line. In accordance with the invention, the apparatus is made to comprise a single shell itself containing both acoustical capacitances, or chambers, and preferably containing also the interconnecting inductance passage in forms which, as will appear, may be adapted to best serve the requirements of particular types of installations and to the flow and pulsation frequency characteristics of the gas stream. The invention broadly contemplates formation or arrangement of the chambers in any suitable manner within a single or unitary shell structure. Typically, as in the later described form particularly adapted to the elimination of pressure pulsations in compressor plant gas lines, the shell may be in elongated form, divided transversely into a pair of chambers interconnected by one or a plurality of substantially imperforate elongated pipes forming the acoustical inductance.

As indicated, the specific form of the invention used in any given instance, may depend upon the source of the gas pulsations, or more strictly speaking, upon the characteristics of the gas flow. To illustrate, where the pulsations are created by a gas compressor, their frequencies will be relatively low and, in conformance with the later-discussed formula, the required inductance passage may be relatively long. Accordingly, such passage may be formed by a pipe of greater length than either of the capacitance chambers, or of the entire shell, as by forming the pipe with return sections.

All various features and objects of the invention will be understood more clearly from the following detailed description, throughout which reference is had to the accompanying drawing, in which:

Fig. 1 is a diagrammatic view showing one embodiment of the invention in a pulsation eliminator connected to a conventionally illustrated compressor;

Fig. 2 is an enlarged fragmentary view, partly in longitudinal section, of the shell;

Fig. 3 is an enlarged fragmentary view taken in the aspect of line 3—3 of Fig. 2;

Fig. 4 is a fragmentary enlargement of a portion of the shell and induction pipe at the partition; and Fig. 5 is a graph illustrative of the transmission and frequency absorption characteristics of the system.

Referring first to Fig. 1, I have indicated at 10 a source of pulsating fluid flow, which in the broad aspects of the invention may be any of different gas compressor mechanisms imparting pulsations of determinable frequency to a fluid stream in pipe 11. Typically the fluid pulsation source 10 may be one or more of any of the usual piston-type compressors employed in gas compressor plants. Such compressors may be single or multi-cylinder and may be single-acting or double-acting. A given compressor will operate to produce pulsations in a connecting gas line at what may be referred to as the fundamental frequency of the compressor. In the case of a single-acting compressor, this fundamental frequency will correspond to the compressor R. P. M., and in the case of a double-acting compressor, the fundamental frequency will be twice the compressor R. P. M. The gas is discharged by the compressor through line 11 and through the pulsation eliminator 12, all as will presently appear. It will be understood that where pulsations are to be eliminated at the intake side of the compressor, line 11 may be regarded as the inlet pipe carrying gas flowing through the pulsation eliminator 12 to the compressor.

In its preferred form, the pulsation eliminator 12 comprises a single elongated shell 13 having a closed end 14 and an upwardly offset gas outlet 15. The shell 13 contains a transverse partition 16 dividing the shell interior into a pair of chambers 17 and 18 which preferably have substantially equal volumes, or common minimum volumes predetermined as hereinafter explained. The shell contains a pipe 19 forming an induction passage interconnecting the chambers 17 and 18, the length of the pipe when used in a system for dampening pulsations in the usual compressor plant gas lines, frequently being substantially greater than the length of the shell 13. Accordingly, provision is made for accommodating within the shell a relatively longer length of pipe, placing the chambers 17 and 18 in communication solely through the pipe.

As illustrated in Fig. 2, the pipe 19 may conveniently comprise two integral return sections 19b and 19c extending through the partition 16 and supported at their ends in a manner permitting relative longitudinal expansion and contraction of the pipe and shell 13. Typically, the return ends 19a of the pipe are shown to be welded at 20 to flexible brackets or supports 21 welded at 22 to the inside of the shell. The pipe 19 is shown to have openings 23 and 24 which may be positioned at any proper locations longitudinally of the pipe to provide and define an effective length of induction passage within the pipe and between the openings in the direction of gas flow, in accordance with the dimensions to be established by the formula given below. The area of each opening 23 or 24, preferably will be at least as great as the cross-sectional area of the pipe 19.

Provision is made, in addition to the normally plugged drains 25 and 26, for automatically removing from the shell 13, and by virtue of the gas flow therethrough, liquids that may tend to separate out of the gas in either of the chambers 17 and 18. When liquid accumulating in chamber 17 rises through nipple 27 into the lower span of the pipe 19, the liquid is carried by the gas stream through the pipe and discharged through opening 24 into chamber 18. By placing a baffle 28 toward the outlet end of the chamber, the leaving gas flows at sufficiently high velocity to entrain and carry liquid from the bottom of the chamber upwardly to and through the axially offset outlet 15.

As will appear, all pulsations above the fundamental frequency of the compressor 10 are substantially eliminated from the gas stream discharging through line 11 at the outlet side of the apparatus 12. When used for purposes of pulsation dampening in gas lines of the character described, the function of the apparatus ordinarily will be mainly to over-come vibrations in the line 11 that would normally impair its stability or security, although other advantages may be present, such as the assurance of non-pulsating flow through gas metering equipment. In other instances, one of the primary functions of the apparatus may be that of a pulsation dampener or eliminator to obviate irregular operation or impairment due to pulsative or vibratory effects, of a pressure responsive device comprising a part or element subject to displacement in accordance with the gas pressure. The pressure gauge 30 and line 11 may be taken as illustrative of such pressure responsive device. Under the influence of pulsating gas flow, the gauge indicator is in a state of constant change, with resultant wear and impairment of the working parts of the gauge. The presence of the pulsation eliminator 12 assures a substantially uniform pressure at the gauge, and stabilization of its moving parts.

At this point it may be observed that the lengths of all ells or return bends used in the chamber interconnecting pipe 19 are added in making the hereinafter explained calculations, as equivalent lengths of straight pipe. The overall length of the pipe 19 is measured between the inlet and outlet openings 23 and 24. The net volume of each chamber (the value of "V" in the equation below) is determined by subtracting the volume of the pipe 19 in the chamber, from the total volume of the chamber.

Best results are obtained by evaluating or predetermining the volumes of the chambers 17 and 18, and the dimensions of the interconnecting passage in pipe 19, with relation to particular conditions for which the installation is to be made. The basis for these determinations is the following equation:

$$\frac{L}{R^2} \times V = \frac{C^2}{78.674 F^2}$$

wherein

L—The length in inches of the passage in pipe 19.
R—Radius in inches of that passage.
V—The volume in cubic inches of one of equal volume chambers 17 or 18, or the minimum common volume, i. e., same or corresponding volumes, of two such chambers not necessarily of equal volume.
C—Velocity, as defined below, in feet per minute of sound in the gas.
F—Fundamental or determined frequency per second of pulsations created in the gas line 11 by the compressor and at the compressor outlet.

Relative to determination of the value of C, if the apparatus is installed at the discharge side of the compressor, the theoretically correct value of C is the velocity of the gas in line 11 plus the velocity of sound in that gas. On the other hand, if the apparatus is installed at the suction or intake side of the compressor, the theoretically correct value of C becomes the velocity of sound in the gas in line 11, minus the velocity of the gas flow in that line. Accordingly, the expression "net velocity" is understood to mean the velocity of sound in the gas, plus or minus the velocity of the gas in the line 11, depending upon whether the apparatus is installed respectively at the discharge or suction sides of the compressor. It may be observed that due to its small value in comparison with the velocity of sound, the velocity of the gas itself may be disregarded without serious sacrifice of satisfactory performance. However, where the formula is to be used in its strict theoretical correctness, the value for the velocity of the gas should be taken into account. In the claims unless specifically qualified the character C broadly denotes the velocity of sound in the gas with or without taking the gas velocity into consideration.

When a reciprocating compressor is a source of pulsation, it is possible to determine or select a fundamental frequency (F) of the pulsations in accordance with the R. P. M. of the compressor, as previously explained. All harmonics of this frequency naturally will be at a higher frequency than this fundamental. Referring to Fig. 5 wherein pulsation transmission is plotted against frequency of the pulsations, the fundamental frequency may be assumed to have the magnitude indicated at F. For purposes of calculation and design, it is only necessary to locate the cut-off frequency of the apparatus to the left of this fundamental compressor frequency, and then the fundamental, as well as its harmonics, will not be transmitted downstream in the line 11.

Generally speaking, the value for F, i. e., the selected cut-off frequency to be used in the equation, may be taken within the range of about 85% to 100% of the actual compressor fundamental frequency. Where a compressor (or internal combustion engine) is operable at variable frequencies, or speeds, the value for F preferably is selected to be just less than the lowest frequency. Satisfactory results have been obtained at a value for F corresponding to about 90% of a compressor fundamental frequency, at which the transmission-frequency curve is substantially as shown in Fig. 5. It is to be noted that at the cut-off point, i. e., 90% of F, the curve 40 may have an abrupt or steep drop indicative of the effectiveness of the higher frequency elimination.

Having determined the value for F, it then remains necessary to evaluate the physical dimensions of the chambers 17 and 18, and of the interconnecting pipe 19. The left-hand side of the equation, i. e., $$\frac{L}{R^2} \times V$$

defines the volume of each chamber and the length and inside radius of the connecting pipe 19. Accordingly, it is only necessary to determine the value for C in order to have an arithmetic value for the entire right-hand side of the equation. The value of the velocity of sound in the gas being compressed is first approximated from existing tables under standard conditions, and is then corrected for pressure and temperature considerations to meet those conditions actually existing at the location in the line 11 where the pulsation is to be arrested.

A value for $$\frac{L}{R^2}$$

is arbitrarily taken to be as large as can be tolerated with regard to pressure loss in the line 19. In other words, knowing the gas pressure at chamber 17 and the rate of gas flow to occur through line 19, the latter may arbitrarily be given length and radial dimensions permitting passage of the gas through the line within a suitable or limiting range of pressure drop. Having thus determined the values for C and $$\frac{L}{R^2}$$

the value of each chamber volume, or V, becomes directly determinable. It should be understood that the determined value for V is substantially a minimum value, and that the chamber volume may be increased beyond that value without impairing performance, although in practice it is ordinarily desirable to make the chamber of a size close to its calculated volume in order to economize on materials and avoid unnecessarily large equipment. With the volume of the chambers and the length and radius of the interconnecting line thus established, it is only necessary to interconnect the parts in a manner most feasible for the particular installation. Experience with different gas line installations indicates that in those instances it has been possible to keep the length of the connecting pipe 19 well under one-fourth the wave length of sound in the gas.

In the equations given above, the value 78.674 represents essentially a conversion factor predicated upon values for L, R, V and C according to the English system, as distinguished from the metric system. If these factors be evaluated in terms of the metric system (expressing L and R as centimeters, V as cubic centimeters, and C as centimeters per second) then the value of pi, or 3.14, is to be used instead of 78.674. It will be understood, and the claims are to be so construed, that the stated equations express the theoretically correct relationship and values, and that in practice it may not be necessary to adhere precisely thereto, so long as the calculations or relative proportions of the apparatus conform fundamentally and substantially to the equations.

To illustrate the practical application, the following example is selected from actual installations:

Problem: To remove pulsations from the air stream discharged by a double acting compression cylinder, crank shaft speed 300 R. P. M., air volume 1,500,000 s. c. f. per day.

$$\text{Fundamental frequency} = \frac{300 \times 2}{60} = 10 \text{ cycles/sec.}$$

Velocity of sound in air at 60° F. and 14.7 p. s. i. =1120 ft./sec.

Equation:

$$\frac{L}{R^2} \times V = \frac{C^2}{78.674 F^2}$$

Substituting—

$$\frac{L}{R^2} \times V = \frac{(1120 \times 60)^2}{78.674(10)^2} = 573,994$$

Desiring to keep the pressure drop through the induction pipe below some selected value, from experience (or by calculation, knowing the rate of air flow), it was determined that the pressure drop through a 6 inch dia., 6 ft. long pipe could be tolerated.

Therefore $$\frac{L}{R^2} = \frac{6 \times 12}{3^2} = 8$$

And $$V = \frac{573994}{8} = 71,748 \text{ cu. in.}$$

I claim:

1. Apparatus for dampening pulsations created in a gas stream by a compressor, comprising an elongated shell containing a pair of relatively large chambers one having a gas inlet and the other a gas outlet, a pipe forming a relatively restricted and elongated induction passage of smaller area than said inlet and outlet interconnecting said chambers for series flow of the gas therethrough, the length of the pipe being greater than the shell length and the pipe containing a correspondingly extended pressure transmitting body of the gas.

2. Apparatus for dampening pulsations created in a gas stream by a compressor, comprising an elongated shell containing a pair of relatively large chambers one having a gas inlet and the other a gas outlet, a wall in the shell separating said chambers, a pipe forming a relatively restricted and elongated induction passage of smaller area than said inlet and outlet interconnecting said chambers for series flow of the gas therethrough, said pipe extending within the shell a distance greater than the shell length and containing a correspondingly extended pressure transmitting body of the gas.

3. Apparatus for dampening pulsations created in a gas stream by a compressor, comprising an elongated shell containing a pair of relatively large chambers one having a gas inlet and the other a gas outlet, a pipe forming a relatively restricted and elongated induction passage of smaller area than said inlet and outlet interconnecting said chambers for series flow of the gas therethrough, said pipe being contained in both of said chambers and extending a distance greater than the shell length, the pipe having a substantially closed wall and containing a correspondingly extended pressure transmitting body of the gas.

4. Apparatus for dampening pulsations created in a gas stream by a compressor, comprising an elongated shell containing a transverse partition dividing the shell interior into a pair of chambers one having a gas inlet and the other an outlet, and a pipe of greater length than the shell forming a relatively restricted and elongated induction passage connecting the chambers and extending longitudinally within the shell through said partition, said pipe being doubled upon itself within each of said chambers and containing a correspondingly extended pressure transmitting body of the gas.

5. Apparatus for dampening pulsations created in a gas stream by a compressor, comprising an elongated shell containing a transverse partition dividing the shell interior into a pair of chambers one having a gas inlet and the other an outlet, and an imperforate pipe of smaller area than said inlet and outlet and greater length than the shell, said pipe forming a relatively restricted and elongated induction passage extending longitudinally within the shell through said partition and having return bends within each of said chambers, the pipe containing a correspondingly extended pressure transmitting body of the gas.

6. Apparatus for dampening pulsations produced in a gas stream by a compressor or the like, comprising a shell containing a pair of chambers through which the gas flows in series, and a circular cross-section conduit of greater length than the shell and forming an acoustical inductance passage interconnecting said chambers, the minimum volume of each of said chambers and the dimensions of said passage having predetermined values substantially in accordance with the following equation:

$$\frac{L}{R^2} \times V = \frac{C^2}{78.674 F^2}$$

wherein

L—Length of said passage in inches;
R—Radius of said passage in inches;
V—Minimum corresponding or common volume of said chambers in cubic inches;
C—Velocity, as herein defined, in feet per minute of sound in the gas;
F—A selected value for the frequency per second of the pulsations created in the gas stream.

7. Apparatus as claimed in claim 6, in which F has a value within the range of substantially 85% to 100% of the actual frequency per second of the pulsations created in the gas stream.

8. Apparatus as claimed in claim 6, in which said conduit is formed by a substantially imperforate pipe.

9. Apparatus as claimed in claim 6, in which said conduit is formed by a pipe doubled upon itself and extending within both of said chambers.

10. Apparatus for dampening pulsations produced in a gas stream by a compressor or the like, comprising an elongated shell containing a transverse partition dividing the shell interior into a pair of relatively large pulsation absorbing chambers through which the gas flows in series, and an open end circular cross-section and substantially imperforate conduit extending through said partition into the chambers and forming an acoustical inductance passage interconnecting said chambers, the minimum volume of each of said chambers and the dimensions of said passage having predetermined values substantially in accordance with the following equation:

$$\frac{L}{R^2} \times V = \frac{C^2}{78.674 F^2}$$

wherein

L—Length of said passage in inches;
R—Radius of said passage in inches;
V—Minimum corresponding or common volume of said chambers in cubic inches;
C—Velocity, as herein defined, in feet per minute of sound in the gas;
F—A selected value for the frequency per second of the pulsations created in the gas stream.

FOSTER M. STEPHENS.

REFERENCES CITED

The following references are of record in the file of this patent:

UNITED STATES PATENTS

| Number | Name | Date |
|---|---|---|
| 1,739,039 | Powell | June 8, 1926 |
| 2,106,482 | Hargnett | Jan. 25, 1938 |
| 2,205,899 | Chipley | June 25, 1940 |
| 2,229,119 | Nichols et al. | Jan. 21, 1941 |
| 2,290,818 | Tyskewicz | July 21, 1942 |